United States Patent
Bolin et al.

(10) Patent No.: US 8,676,217 B2
(45) Date of Patent: Mar. 18, 2014

(54) METHODS AND SYSTEMS FOR CELL RE-PLANNING TO OBSCURE NETWORK TOPOLOGIES

(75) Inventors: Johan Bolin, Spånga (SE); Karl Torbjörn Wigren, Uppsala (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 651 days.

(21) Appl. No.: 12/346,128

(22) Filed: Dec. 30, 2008

(65) Prior Publication Data

US 2010/0009683 A1  Jan. 14, 2010

Related U.S. Application Data

(60) Provisional application No. 61/078,851, filed on Jul. 8, 2008.

(51) Int. Cl.
*H04W 40/00* (2009.01)

(52) U.S. Cl.
USPC ......... 455/446; 455/435.2; 455/436; 455/437

(58) Field of Classification Search
USPC .................................. 455/437, 446
See application file for complete search history.

(56) References Cited

U.S. PATENT DOCUMENTS

| | | | |
|---|---|---|---|
| 6,882,844 B1 * | 4/2005 | Keski-Heikkila et al. | 455/446 |
| 2005/0027758 A1 * | 2/2005 | Meller et al. | 707/204 |
| 2008/0039132 A1 * | 2/2008 | Delibie et al. | 455/552.1 |
| 2008/0113670 A1 | 5/2008 | Dufour et al. | |
| 2009/0047955 A1 * | 2/2009 | Frenger et al. | 455/436 |
| 2009/0047956 A1 * | 2/2009 | Moe et al. | 455/436 |
| 2011/0092220 A1 * | 4/2011 | Bernini et al. | 455/452.2 |

FOREIGN PATENT DOCUMENTS

WO  0186988 A1  11/2001

OTHER PUBLICATIONS

International Search Report in corresponding International application No. PCT/SE2008/051573, mailed Sep. 7, 2009.
Dahlman, E., et al., "3G Evolution: HSPA and LTE for Mobile Broadband," First Edition, 2007, pp. 328-333, 336-339, 381-382.

* cited by examiner

*Primary Examiner* — Charles Appiah
*Assistant Examiner* — Mazda Sabouri
(74) *Attorney, Agent, or Firm* — Potomac Patent Group PLLC

(57) ABSTRACT

Methods and systems for obscuring network topologies are described. Cell re-planning techniques can be used to modify cell identities to obscure a relationship between nodes in a communication system and their geographical location. One or more algorithms can be used to operate on, e.g., cell plan lists, cell neighbor lists and/or cell identities.

34 Claims, 9 Drawing Sheets

METHODS AND SYSTEMS FOR CELL RE-PLANNING TO OBSCURE NETWORK TOPOLOGIES

RELATED APPLICATIONS

This application is related to, and claims priority from, U.S. Provisional Patent Application Ser. No. 61/078,851, filed on Jul. 8, 2008, entitled "Methods and Systems for Cell Re-Planning to Obscure Network Topologies" to J. Bolin et al., the entire disclosure of which is incorporated here by reference.

TECHNICAL FIELD

This application is related, generally, to communications systems, devices and methods and, more specifically, to mobile devices, services and software for protecting sensitive information from being disclosed to unauthorized third parties.

BACKGROUND

Mobile phones, and services on mobile handsets (the term "mobile handset" also referring to embedded devices in e.g. PCs, laptops, vehicles etc.) have had a fantastic evolution during the last decade. When 3GPP standardized GSM, and later 3G during the late 1980's and 1990's, circuit switched telephony and later Short Message Service (SMS) were primarily the only services available. Since then, mobile handsets and networks have evolved to create powerful devices capable of running both local applications and browser based services, connected to a network providing a bandwidth high enough for TV and interactive multimedia. With the increasing bandwidth, and need to provide a feasible technical platform and transport technology for multimedia services, packet-switched networks, e.g., using Internet Protocol (IP) as the fundamental technology, are becoming the dominating platforms for mobile services. There are a number of reasons why this trend is being supported by most actors in the communications business. One reason is that third parties will start to develop applications for such systems, and just as in the case with Internet, this will likely be a key to the expected success of next generation technologies. Another reason is that IP provides a technology platform where it is cheaper to deploy functionality. This is to a large extent due to economy of scale, as technology also used by the IT industry is cheaper than traditional telecom technology.

Additionally, with the increasing bandwidth, advanced mobile handsets having IP connectivity, a functionality that was previously implemented as a tightly integrated functionality in the operators' networks with so-called "thin" (e.g., relatively limited processing and/or memory resource) clients and using control channels for communication, are available as applications located in the IP domain in the operators' network (or even outside of their networks), and with a relatively "thicker" (e.g., having relatively more resources) client on the handset. In order for these "thicker" clients to communicate with servers in the network, there is often a need to transfer information therebetween, e.g., information regarding the network capabilities and/or the native functionality in the handset, and there arises, therefore, a need for interfaces and protocols which enable the exchange of such information. This functionality and information is, to a large extent, what is often referred to as the "control plane" of a communication system, while the communications between a client associated with the handset and a server in the network, e.g., based on a packet-based technology such as IP, is usually referred to as the "user plane".

There are several interfaces which have the capability to obtain data about the native functionality of the handset and network information stored in the control plane, in the handset, which an operator would not like to share with an unauthorized user or server. Such interfaces are based on operating system (OS), which typically provides most of the native functionality that is available in the handset. Examples of OS are Symbian, Nokia Series 60, Windows Mobile and Linux. These OSs may provide interfaces for services and information that are available in the control plane. Examples of such services and information include Call Control, SMS/MMS services, as well as network information, e.g., base station ID to which a handset is currently attached, neighbor list and active/passive set. In addition to the interfaces provided by the OS, Java (J2ME) or other run time environments also provide a wide set of standardized interfaces in which a Java application may obtain access to the services and information from the control plane.

On the other hand, since the user plane based services typically mean lower investment cost and shorter time to market, the Open Mobile Alliance (OMA) has standardized service enablers based on user plane signaling. One example of a user plane based service is the user plane based positioning standardized in OMA Secure User Plane Location (SUPL). In SUPL, a SUPL client in the terminal may access network information and positioning capability. The client may communicate with a SUPL Server using IP and a provisioned IP address.

This type of architecture raises certain issues and challenges. As the interfaces to the control plane provide the user plane services with a mechanism to obtain information from the control plane, this information can be exported to entities outside of the operators' domain. However, since some of the information from the control plane may be sensitive and can be abused by entities outside the operator, these interfaces may introduce a commercial, and sometimes a security, risk for the operator. As various services and clients need the information provided by these interfaces and thus, the information has to be supplied to the legitimate services and/or clients. Such legitimate services and/or clients are those, for example, that have established an agreement with the operator for receiving sensitive network information. One example of such sensitive network information is the Cell-ID and also the neighbor list, i.e., a list including neighbor base stations and/or cells of a given cell. For services such as OMA SUPL positioning and IP Multimedia Subsystem services, the user plane clients need the information from the control plane in order to work properly. Thus, hiding the information from the control plane from everybody except the operator is not a solution.

When information such as the Cell-ID is available to applications in the user plane, other actors than the operator can monitor and register the information and use it to compete with the operator, for example, to gain business advantages. One example of such competitive use is that of independent actors (not related or in a relationship with the operator) providing user positioning services and statistics, using the operator's infrastructure. Another competitive use is that of competing operators monitoring, and keeping registers of, competing operator's network infrastructure for business intelligence. In addition to these commercial examples, there are also some countries in which the information, such as cell planes, is supposed to be kept secret due to national security reasons. As the information as such, e.g. the Cell-ID, often is used in a large number of nodes and systems in the operators network (e.g. access and routing control, user management and charging etc.), this information should be properly controlled by the operator to be available to the permitted services and/or clients and also to the equipment within the network.

Accordingly, it would be desirable to provide devices, systems and methods that avoid the afore-described problems and drawbacks.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 5(c) depict cell lists or vectors before and after execution of the operation described with respect to FIGS. 5(a) and 5(b);

SUMMARY

According to an exemplary embodiment, a method for changing cell identities in a communication system includes the step of: transmitting a signal toward at least one node, the signal including one of (a) a command to perform an operation on the cell identities to change the cell identities from a first set of cell identity values to a second set of cell identity values, and (b) the second set of cell identity values.

According to another exemplary embodiment, a node in a communications system includes a memory device for storing at least one of (a) at least one operation to be performed on cell identities to change the cell identities from a first set of cell identity values to a second set of cell identity values, and (b) at least one command value associated with the at least one operation, and a processor for transmitting at least one of the second set of cell identity values and one of the at least one command values.

According to still another exemplary embodiment, a method for changing cell identities in a communication system includes the steps of: receiving, at a node, a signal including one of: (a) a command to perform an operation on the cell identities to change the cell identities from a first set of cell identity values to a second set of cell identity values, and (b) the second set of cell identity values and replacing the first set of cell identity values with the second set of cell identity values.

According to another exemplary embodiment, a node in a communications system includes: a memory device for storing a first set of cell identity values, and a processor for receiving one of (a) a command associated with at least one operation to be performed on the first set of cell identity values to generate a second set of cell identity values, and (b) the second set of cell identity values.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Figure 1:
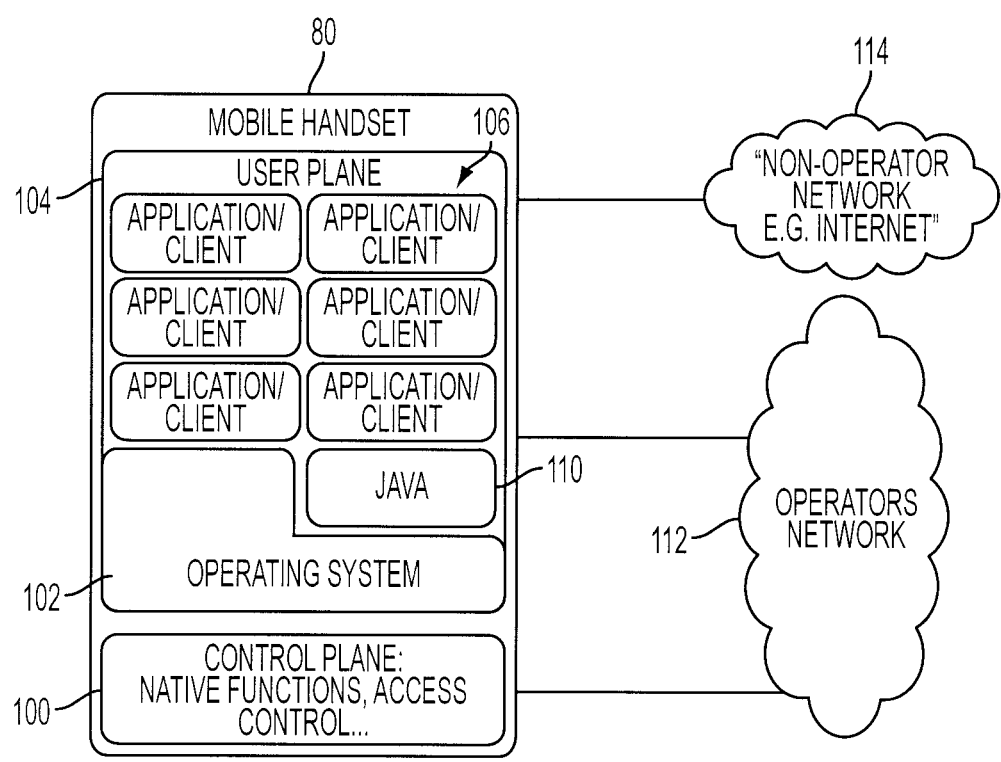
FIG. 1 illustrates an exemplary mobile handset.

As mentioned above, existing interfaces to control plane information and functionality enable user plane services to obtain access to information from the control plane, and this information can be exported to entities out side of the operator's domain. Consider, in this regard, the conceptual view of a typical mobile handset 80 illustrated in FIG. 1. Therein, a bottom layer 100 represents the control plane, which provides the core functionality of the mobile handset 80, e.g., communications with the mobile phone via control signalling used to manage the connection, mobility and also some of the basic services (e.g., call control and short messaging service (SMS)). On top of the control layer 100 there is typically an operating system 102, which manages the phone's functionality and provides the interface to functionality for applications and clients in the user plane 104. Clients and/or applications 106, such as browsers, calendars and games, are examples of services implemented in the user plane 104, on top of the operating system 102.

The mobile phones may also include a Java virtual machine (JVM) 110. The JVM 110 may run on top of the operating system 102 and enables Java based applications to run on the handset 80. There are various JVMs which are adapted for platforms with different computing capacity and characteristics. One common JVM for mobile handsets is known as the Java Micro Edition, J2ME. J2ME provides a number of application programming interfaces (APIs) for application developers to use when developing applications for mobile handsets.

As mentioned earlier, the user plane 104 is disposed above the operating system 102 and JVM 110. The user plane 104 may include one or more applications and/or clients. One difference between a client and an application may be that an application provides a service to the user while the client may perform a function for the network and not a direct service to the user, i.e., the client has a low level functionality to the user. These applications and clients 106 may use the communication channels of the user plane for exchanging data with the operator's network or with third parties. Such communication channels may include, for example, General Packet Radio Services (GPRS) channels and/or TCP/IP channels. These channels may be used to communicate with application and content servers 112, inside the operator's network (control domain) or servers 114, which are outside the operator's domain (e.g., Internet servers).

Applications 106 may access information and functionality in the handset 80 either via the operating system 102 or Java 110. Additionally or alternately, a natively installed client 106, such as an OMA SUPL client, may be provided in the user plane to access information in the control plane. Thus, an application or client 106 in the handset 80 can extract, via APIs in the OS 102 and Java 110, but also by using native clients such as OMA SUPL 106, information from the control plane or invoke functionality and send this to servers 114 outside the operator's network 112.

Since this information includes identities of base stations (e.g., identity information including the country code, operator code, location area, and base station unique identity), a third party outside of an operator's network can use this information to create a database which contains the operator's network topology. By using a positioning mechanism (e.g., GPS or an operator provided positioning service), the operator's network topology can also be associated with a geographical reference. When such a mapping is performed, the base station identity (e.g., cell-id) available in the mobile phone 80 can be used to associate the handset with a geographical location. This association can then be used in a wide set of services for the end user, or simply for data mining. Examples of such services include user plane positioning according to OMA SUPL and IP Multimedia Subsystem services. In addition to the risk that the network topology and geographical reference is used for commercial purposes, there are also countries where the geographical topology of the networks is considered sensitive information for national security reasons.

In order for a geographical mapping of the network topology to work well to detect users locations, topology maps are needed which are relatively reliable. If the topology information continuously changes, such databases will have difficulty maintaining the required level of accuracy. Thus, according to exemplary embodiments, mechanisms are described herein to make it more difficult (i.e., for other third parties other than the operator/owner of a network) to keep a valid mapping between network topology and geographical location. This is achieved by, for example, providing for cell re-planning that introduces a dynamic which makes it difficult for third parties to keep track of a network's topology.

According to one exemplary embodiment, a network is periodically re-planned in a manner which balances (1) the need to introduce sufficient dynamic change into the topology that third parties have difficult maintaining a sufficiently accurate database for use in providing, e.g., location based services against (2) implementing this dynamic change in such a way that it minimizes the impact on the existing system operation which may not have been designed initially to support a high frequency of topology changes. More specifically, exemplary embodiments can (1) optimize the change measured as spatial difference and share of topology that has been re-planned, while minimizing the relative change needed to detect that a change has taken place, (2) offer a variety of operations for the re-planning which can be performed to make it hard to for third parties to predict the result of the re-planning, and (3) implement an efficient way to execute a cell re-plan using a relatively low amount of signaling and provisioning of network elements, in particular base stations.

Figure 2:
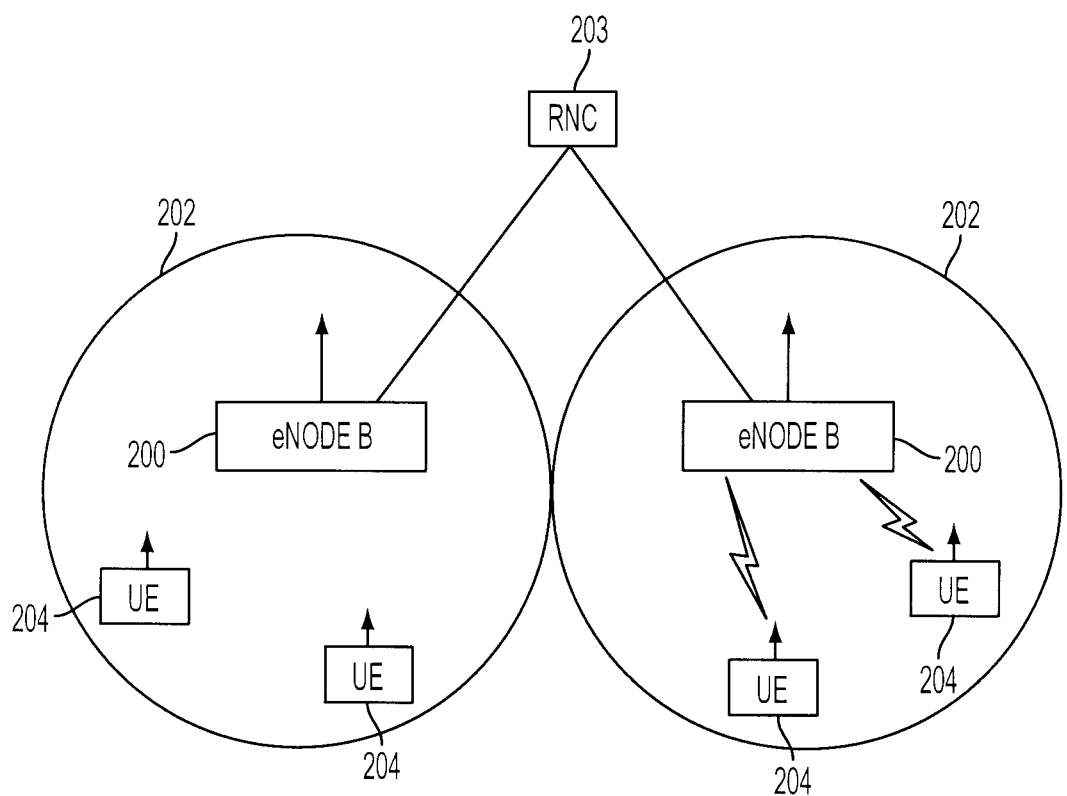
FIG. 2 illustrates an exemplary radio communication network in which exemplary embodiments can be implemented.

Prior to discussing these exemplary embodiments in more detail, and to provide some context for the more detailed discussion of obscuring network topologies according to these exemplary embodiments, consider first the exemplary radiocommunication system illustrated in FIG. 2. Beginning with the radio access network nodes and interfaces in FIG. 2, it will be seen that this particular example is provided in the context of LTE systems. Nonetheless, the present invention is not limited in its applicability to transmitters or transmissions associated with LTE systems and can instead be used in any system including, but not limited to Wideband Code Division Multiple Access (WCDMA), GSM, High Speed Packet Access (HSPA), UMB, WiMaX and other, systems, devices and methods. Since, however, the example in FIG. 2 is provided in terms of LTE, the network node which transmits and receives over the air interface is termed an eNodeB, several of which eNodeBs 200 are illustrated therein.

In the context of the air interface, each eNodeB 200 is responsible for transmitting signals toward, and receiving signals from, one or more cells 202. Each eNodeB includes multiple antennas, e.g., 2, 4, or more transmit antennas, as well as potentially multiple receive antennas, e.g., 2, 4, or more receive antennas, and handles functions including, but not limited to coding, decoding, modulation, demodulation, interleaving, de-interleaving, etc., with respect to the physical layer of such signals. Note that, as used herein, the phrase "transmit antennas" is specifically meant to include, and be generic to, physical antennas, virtual antennas and antenna ports. The eNodeBs 200 are also responsible for many higher functions associated with handling communications in the system including, for example, scheduling users, handover decisions, and the like. The interested reader who desires more information regarding transmit or receive functions associated with LTE or other systems in which these exemplary embodiments may be deployed is directed toward the book entitled "3G Evolution—HSPA and LTE for Mobile Broadband", by Erik Dahlman et al., published by Elsevier Ltd., 2007, the disclosure of which is incorporated here by reference.

As mentioned in the Background section, some third parties may provide location based services by, for example, creating an overlay or map which relies upon knowledge of an operator's network and, more specifically, the location of base stations or other nodes in the system. For such an overlay location solution to work properly, the locations associated with the cells should be known rather accurately. If they are not, the user who is accessing these services will receive erroneous locations. As the cell plans in a network may be updated occasionally, such an overlay solution will typically also attempt to detect when an operator's cell plan has changed and update the overlay data base accordingly. In this regard, one method which can be used to detect that a cell plan has been changed is to, at a given time, compare the relationship between one cell and its neighbouring cells with previously performed measurements. Consequently, if the network operator can change the location of a large (the larger the better) number of cells in the network, but make this change difficult to detect, an overlay solution will have difficulty operating properly. Additionally, it would be preferable to provide for such a cell re-planning algorithm which is easy to implement in the core and radio network, i.e., since the network will typically consist of a large number of nodes, the provisioning process associated with the cell re-planning should be as simple as possible.

Thus, according to an exemplary embodiment, cell re-planning is performed by communicating one cell re-planning instruction to all relevant nodes, which instruction informs those nodes regarding how the network information shall be updated, e.g., as a bit shift or other common operation that applies to the identities (codes) of the nodes in the geographic area that shall be re-planned. The area to be re-planned may, for example, be the entire network, a portion of the total network area, or one or more of a number of bordering areas within the network. Thus, according to exemplary embodiments, many elements or cells within an operator's network (preferably, but not limited to, all cells) change place in the operator's cell plan periodically, but at the same time the geographical location of the re-planned cells changes only by a small amount, thereby making detection of this change relatively difficult by third parties. Such re-planning may occur, and corresponding instructions transmitted to the affected nodes, at regular or irregular intervals.

Figure 3:
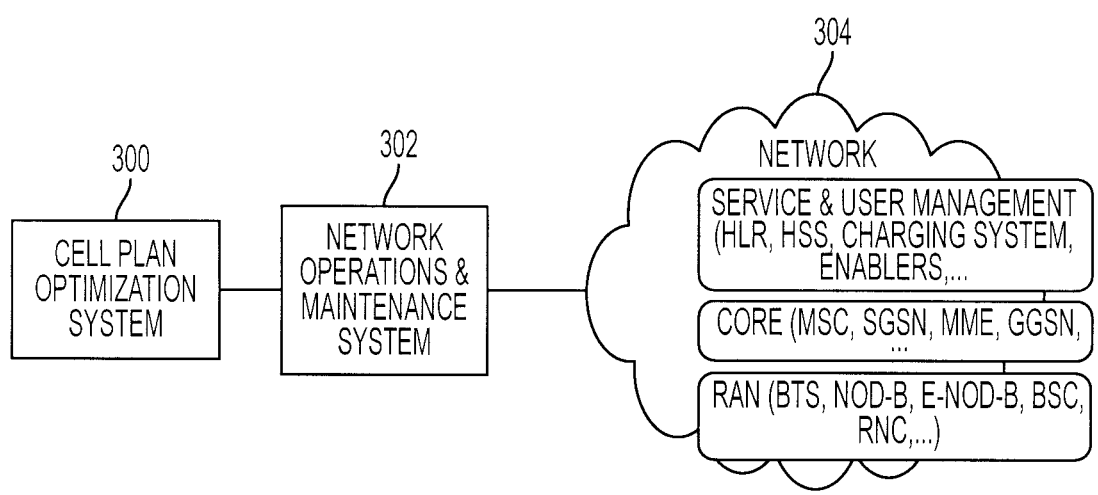
FIG. 3 depicts the radio communication network of FIG. 1 at a higher level associated with cell re-planning according to an exemplary embodiment.

At a higher level, e.g., associated with cell re-planning according to exemplary embodiments, the network of FIG. 2 can be seen logically as shown in FIG. 3. Therein, the system includes a Cell Plan Optimization Algorithm (CPOS) 300 which may be implemented as a function within, for example, the Network Operations & Maintenance System (NOMS) 302, and which implements an algorithm for optimizing the cell plan based on inputs such as the old cell plan(s), statistical data of traffic and user density, etc. The NOMS 302 will thereafter manage the provisioning of the cell re-planning result to those nodes in the network 304 affected by changes in the cell plan. These nodes include, but are not limited to: base stations 200 (e.g., BTSs, Node-Bs, eNode-Bs); radio network controllers (e.g., BSCs, RNCs) 203; switches, routers and gateways (e.g., MSCs, SGSNs, MMEs, GGSNs); and service and user management systems (e.g., HLRs, HSSs, charging systems, positioning systems, mobile TV systems, etc.).

Figure 4:
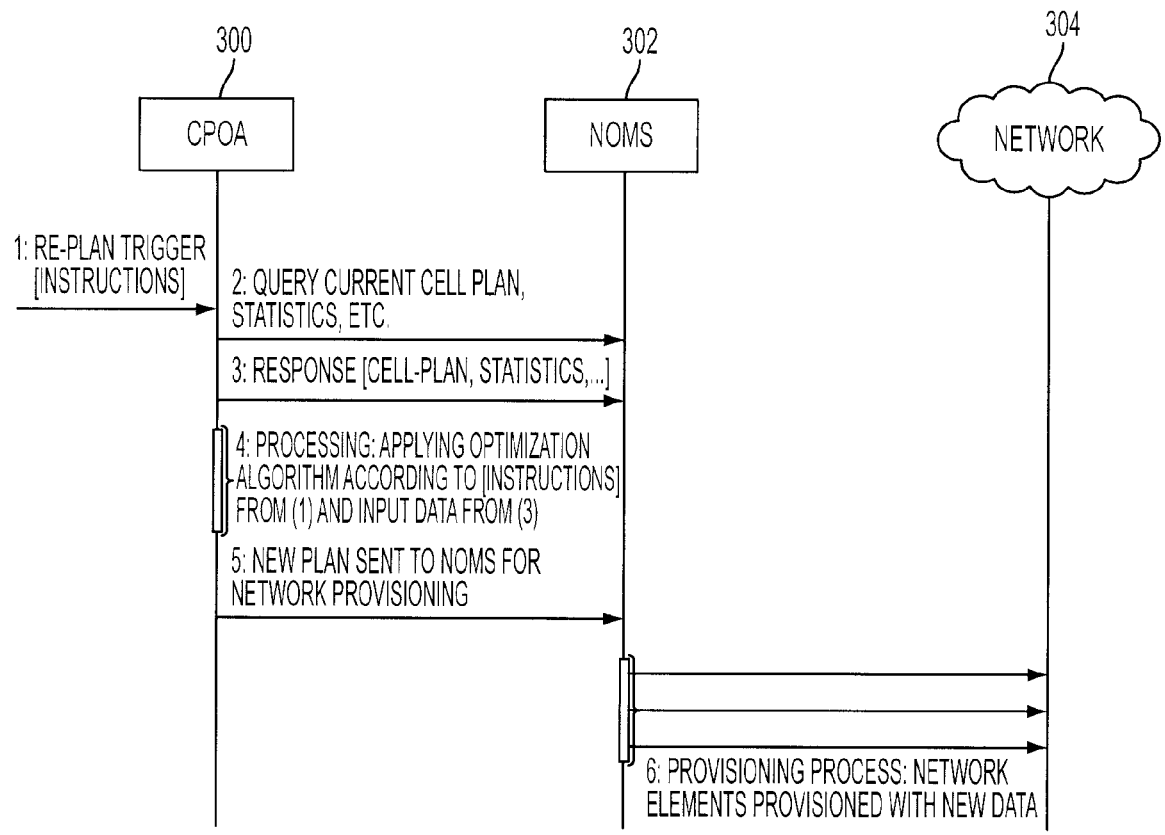
FIG. 4 is a signaling diagram illustrating cell re-planning according to an exemplary embodiment.

These network entities 300, 302 and 304 can interact with one another to implement cell re-planning according to exemplary embodiments as shown in FIG. 4. Therein, at signal 1, a cell re-planning activity is triggered in any desired manner, e.g., automatically at regular or irregular intervals, or manually. The trigger signal 1 can include instructions, e.g., regarding whether the cell re-plan shall be applied to the entire network, a geographically limited part of the network, according to reported statistics or based on some other condition(s). The CPOA 300 queries the NOMS 302 via signal 2 for information such as the current cell plan, statistics associated with historical traffic within the network (e.g., data traffic, voice traffic, etc.) and other information to be used for the cell re-planning. In response, the NOMS 302 sends response signal 3 with data, statistics, etc., back to the CPOA 300. The CPOA 300 processes the reported data and determines the appropriate re-planning of the cells as shown by block 4. The result of the processing by CPOA 300 is a new cell plan including configurations (e.g., items such as transmit power levels, hysteresis values, etc.), which cell plan is sent via signal 5 to NOMS 302 for provisioning of the network elements (nodes). The NOMS 302 performs the provisioning process as illustrated by signal 6, i.e., provisioning all effected nodes by updating them with new data associated with the new cell plan. It will be appreciated by those skilled in the art that the signaling diagram of FIG. 4 is purely exemplary and, also, omits certain additional signaling, e.g., acknowledgement signals such as 200 OK messages, etc. Moreover, according to exemplary embodiments described below, when the new cell plan is generated as part of a process to obscure the network topology, it can be created algorithmically as a variant of the current cell plan, e.g., without consideration of traffic statistics and the like which might normally be considered for cell re-plans which are performed for reasons other than obscuring network topology.

Figures 5A, 5B:
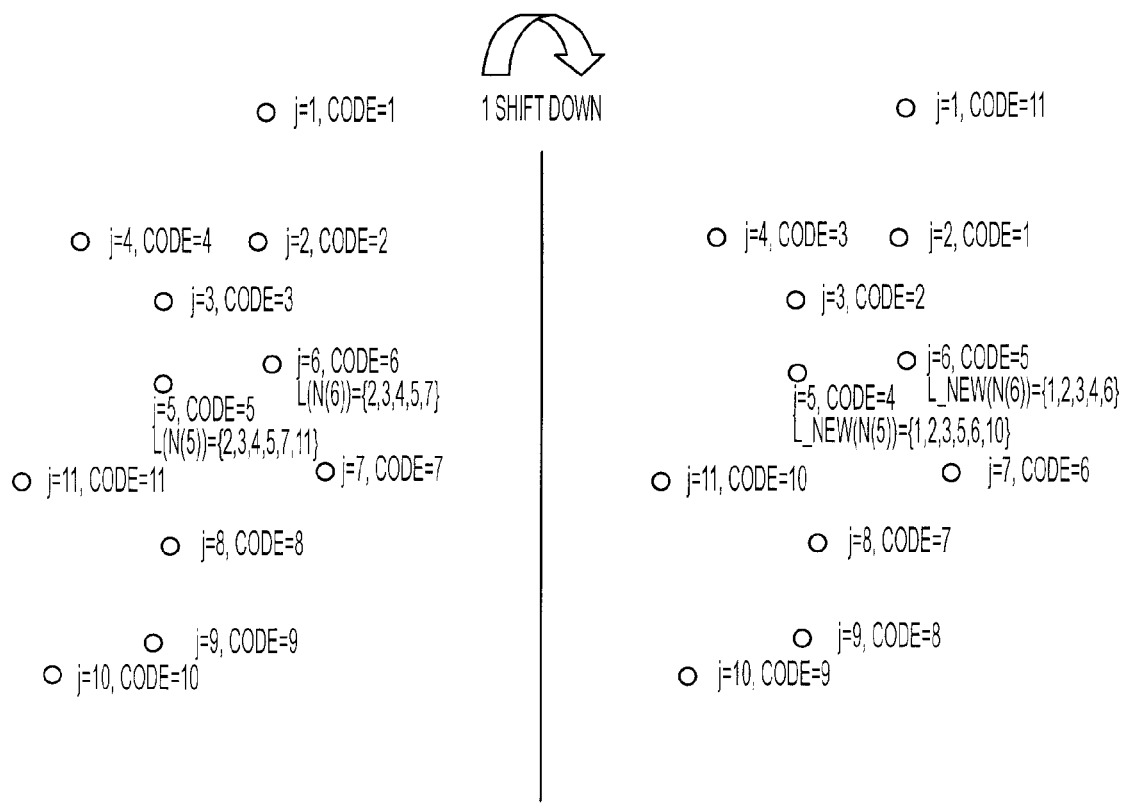
FIGS. 5(a) and 5(b) show an exemplary cell map/list before and after execution of an operation on the cell list according to an exemplary embodiment.

The cell re-plan list can, for example, be constructed according to the following rules. First, the position j in the cell re-plan list refers to one fixed cell of the geographically connected region. Second, the value of the list element at position j refers to the re-planned cell identity, i.e., $L(j)$=code $(k)$, $j=1, \ldots, J$, where code($k$) is the identity of the k:th cell (here re-planned to cell j) stored at location j of the list L, and where J denotes the number of cells. To begin with, a list compiled in accordance with these rules can be initialized according to: $L(j)$=code($j$), $j=1, \ldots, L$, as shown in FIG. 5(a), wherein each dot represents an eNodeB 200, base station, or the like, and has a representative entry in the list. Thus, according to some exemplary embodiments, the initial position in the list can be generated by a procedure that begins with a cell at a distinct border of the geographical region being re-mapped. This cell is then marked as used or re-mapped. Then the nearest neighbour cell that is not marked already as used or re-mapped is added as the next element in the list, and it is then marked as used. The procedure is continued for all J cells. The cells which neighbor a specific cell that are distributed within the network are thus defined with respect to the fixed location in the list, i.e., with respect to the index j. This can be expressed as:

$$N(j)=\{n(j)\}=\{n(1,j), \ldots, n(N9j)\}$$

A few examples of operations or algorithms which can be performed on the cell plan list to generate a modified version thereof, e.g., to obscure the network topology, will now be discussed. According to exemplary embodiments, the cell plan (or re-plan) list L is changed by one or more simple, pre-specified operations that can be signaled to each dependent node, where the dependent node can then update its stored copy of the neighbor cell list by performing those pre-specified operation(s). The signaling needed for such a set of operations can therefore be implemented, for example, by signaling of a code or indicator that uniquely points out the operation that shall be applied to each node's neighbor cell list.

For example, as shown in FIG. 5(b), one such operation which can be performed on the neighbor cell list is the "shift one down" operation. This operation involves "pushing" the code associated with each cell "down" one place to the next cell in the list. For example, as seen between FIGS. 5(a) and 5(b), the node having a position in the list of j=2 has a code=2 before the shift one down operation is performed and a code=1 after the shift down one operation is performed, the node having a position in the list of j=3 has a code=3 before the shift one down operation is performed and a code=2 after the shift down one operation is performed, and so on. The node having a position in the list of j=1 has a code=1 before the shift down one operation is performed and a code=11 after the shift down one operation is performed, i.e., a wrap around occurs of the code from the bottom of the list to the top of the list in this exemplary embodiment.

This shift one down operation can be expressed algorithmically as follows:
Temp=L(J)
L_new(j)=L(j−1),j=2, . . . ,J
L_new(1)=Temp.
The codes found in each node's stored neighbor cell list then become:
L_new(N(j))=L_new({n(1,j), . . . ,n(N(j),j)}={L_new(n(1, j)), . . . ,L_new(n(N(j),j))}
i.e., the new codes in the cell plan list are also used for the neighbor cell list. Examples of the stored, neighbor cell lists before the shift down one operation and after the shift down one operation are shown in FIGS. 5(a) and 5(b) for the nodes located at j=5 and j=6. The effect will be that a consistent new set of neighbor cell codes will be broadcasted to the terminals in the various cells. However since adjacent elements of the list L correspond to geographically close cells, it is highly likely that adjacent elements will share neighbors.

Figure 5C:
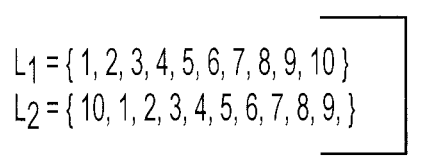

To better understand the results of such algorithmic cell re-plans according to these exemplary embodiments, consider first that each eNodeB 200, or the like, provides radio-communication service coverage to a particular geographic area, commonly referred to as a "cell". For any given area in a mobile radiocommunication network, the cells providing service coverage for the area can be mathematically described by a list L of all of the cells of any of the geographically connected regions of a cellular network. For example, as shown in FIG. 5(c), a network having the plurality of cells associated with the nodes illustrated in FIGS. 5(a) and 5(b) can be compiled into lists $L_1$ and $L_2$, respectively for use in describing the network topology, which lists can be stored for use in the various nodes in the system. If there are several distinct geographical regions of the network, a separate list can be provided for each distinct geographical region. Similarly, lists of neighboring cells, e.g., L(N(#cell), can be compiled and stored in the various nodes.

The effect of using this exemplary operation for cell re-planning according to this exemplary embodiment is that an external actor (third party) monitoring the neighbor cell lists for a specific cell will have difficulty detecting the occurrence of a shift down one step and, therefore, difficulty in maintaining an accurate database of cell positions. Referring again to FIGS. 5(a) and 5(b), it can be seen that the pre-operation neighbor list L_new(N(5)) contains several elements from post operation neighbor list L(N(5)), and similar comments apply to neighbor lists L_new(N(6)) and L(N(6)). However, since the codes of the base station have shifted, an outside agent may very well correlate to the wrong cell, thus not noting the shift.

In addition to, or as alternatives to, using a shift down one step operation for adjusting cell plans as described in the foregoing exemplary embodiment, the following operation may be used: shift up one step, shift down k steps, shift up k steps, pairwise exchange between blocks of adjacent entries of the list or individual adjacent entries of the list, or any of these operations applied to a subset of the list. It will be appreciated that this list of operations which can be performed on the cell plan list, cell re-plan list and/or the cell neighbor list is not intended to be exhaustive and that other operations could be used. The complete, post-operation neighbor list can be sent to the relevant nodes or, alternatively, the signaling involved in, e.g., the provisioning process shown in FIG. 4, can be reduced to the signaling of an order to execute a specific operation on the list by the node(s) which receive the signal. For example, NOMS 302 can send a command to each affected node to perform a shift one down operation on its cell plan list and/or neighbor list of cells. When a shifting of the cell identities is desired according to exemplary embodiments, Thus, it will be appreciated that the foregoing exemplary embodiments provide mechanisms for protecting an operator's network topology relation with geography. This involves, for example, the creation of a list of cells, for a specific, geographically connected part of a cellular network, the list being organised so that geographically close cells will correspond to fixed list indices that are also close, and storage of values of each entry of the organised list. The stored values can include the currently valid code for the cell corresponding to a particular index of the organised list. Operations on the list can result in moving at least two of the codes to new positions in an updated list, such operations including one or more of: shift down 1 step, shift down k steps, shift up 1 step, shift up k steps, pair wise exchange between blocks of adjacent entries of the list, or any of the previous alternatives applied to subsets of the list. Note that the operations may be decided and ordered from one deciding node, e.g., NOMS 302, and then signalled to a set of other depending nodes, wherein the depending nodes maintain the list and the list of neighbour cells, and execute the operations on the list. Alternatively, the deciding node may execute the operations on the list and send the results to the depending nodes.

Figure 6A:
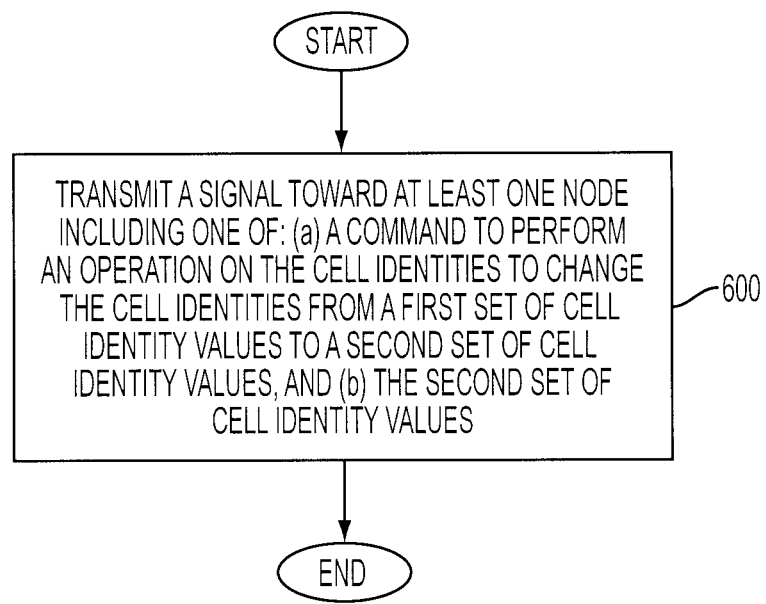
FIGS. 6(a) and 6(b) are flow charts illustrating methods for changing cell identities according to exemplary embodiments.
Figure 6B:
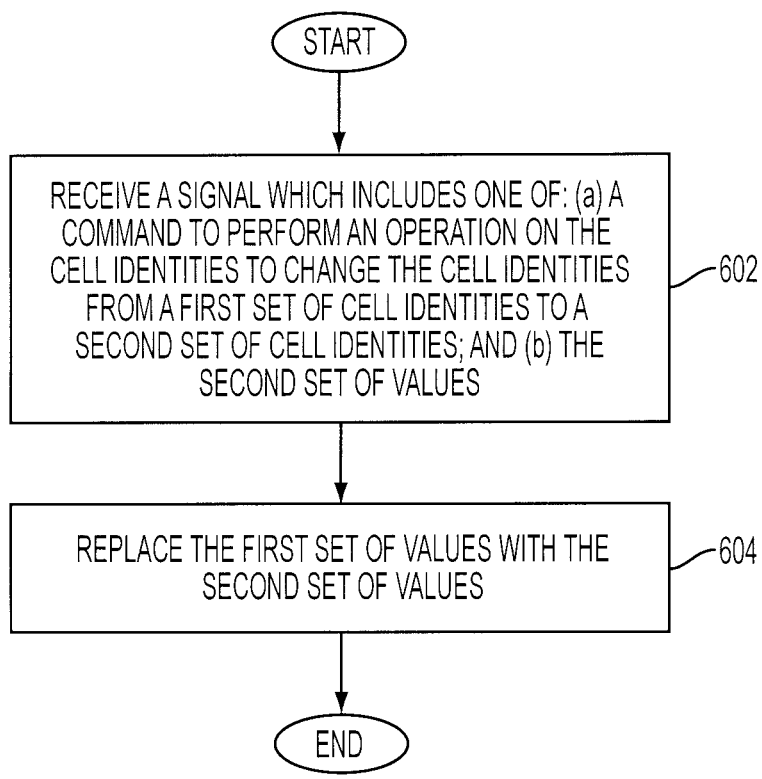

According to one exemplary embodiment, a method for changing cell identities in a communication system from the perspective of the network, e.g., NOMS 302, can include the step illustrated in the flowchart of FIG. 6(a). Therein, at step 600, a signal is transmitted toward at least one node, e.g., those node(s) affected by the cell re-plan, the signal including one of:(a) a command to perform an operation on the cell identities to change the cell identities from a first set of cell identity values to a second set of cell identity values, and (b) the second set of cell identity values itself. Similarly, from the perspective of the node(s) which receive such signals, a method for changing cell identities in a communication system can include the steps illustrated in the flowchart of FIG. 6(b). Therein, at step 602, a signal is received at a node which includes one of: (a) a command to perform an operation on the cell identities to change the cell identities from a first set of cell identity values to a second set of cell identity values, and (b) the second set of cell identity values. This information may then be used, at step 604, to replace the first set of cell identity values with the second set of cell identity values, e.g., either directly if the signal contained the second set of values (i.e., if the network performs the operation and sends the resulting values to the node) or after the node performs the requested operation on the first set of values.

Figure 7:
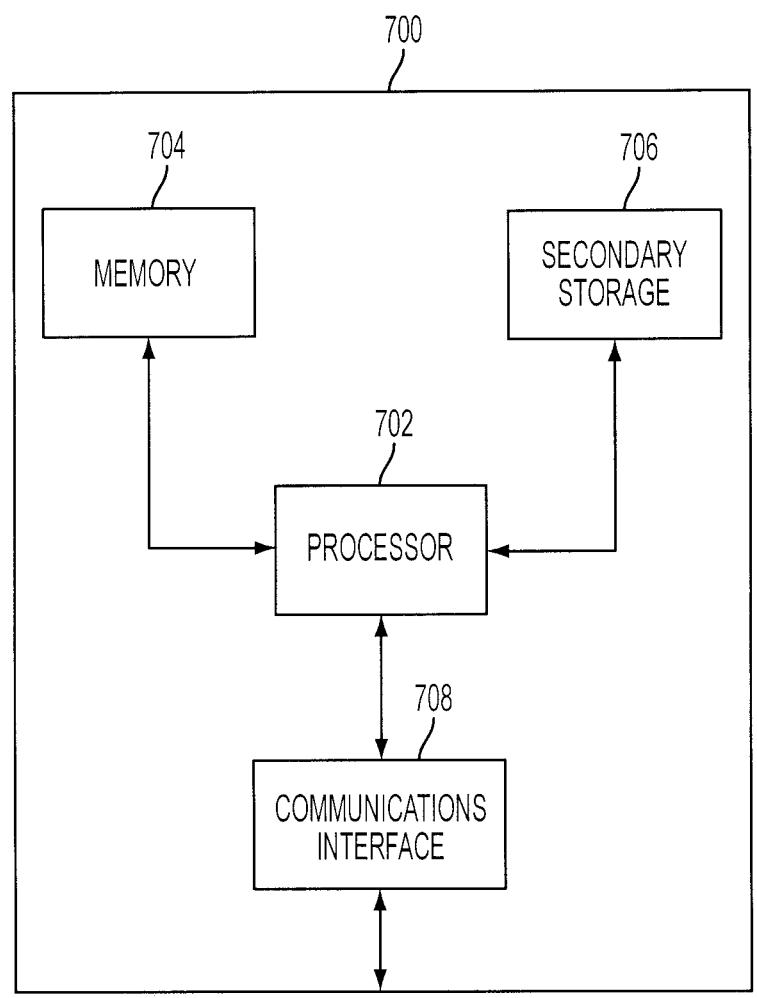
FIG. 7 illustrates a communications node which can be used to implement exemplary embodiments.

An exemplary communications node 700 which can be used, for example, to either transmit or receive the above-described signal is illustrated in FIG. 7. Therein, the communications node 700 can contain a processor 702 (or multiple processor cores), memory 704, one or more secondary storage devices 706 and a communications interface 708 to facilitate communications itself and the rest of the network(s). Processor 702 can also perform the above-described operation(s) on the cell plan list, neighbor cell list, etc., in response to a suitable command. The revised, cell plan list, neighbor cell list, etc., may then be stored in memory 704.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

The present exemplary embodiments may be implemented in a user equipment, a base station, a radio network controller and generally in a wireless communication network or system comprising both the user equipment, the base station and a higher level, network node. The exemplary embodiments may also be implemented in an application specific integrated circuit (ASIC), or a digital signal processor. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. A processor in association with software may be used to implement a radio frequency transceiver for use in the user equipment, the base station or any host computer. The user equipment may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor. The foregoing description of exemplary embodiments provides illustration and description, but it is not intended to be exhaustive or to limit the invention to the precise form disclosed. Modifications and variations are possible in light of the above teachings or may be acquired from practice of the invention. The following claims and their equivalents define the scope of the invention.

Thus, it will be apparent that exemplary embodiments also relate to software, e.g., program code or instructions which are stored on a computer-readable medium and which, when read by a computer, processor or the like, perform certain steps associated with transmitting information signals which are abstracted or hidden in the manner described above.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. A method for changing cell identities in a communication system from a first set of cell identity values to a second set of cell identity values, said method comprising:
    transmitting a signal toward at least one node, said signal including one of:
        (a) a command to perform an operation on said cell identities to change said cell identities from said first set of cell identity values to said second set of cell identity values; and
        (b) said second set of cell identity values;
    wherein each cell has a first identity value in said first set of cell identity values and said each cell has a second identity value in said second set of cell identity values, said first identity value being different than said second identity value; and
    further wherein said second identity value is used in said first set of cell identity values to identify another cell which is geographically close to said each cell,
    wherein said change of cell identities from said first set of cell identity values to said second set of cell identity values occurs periodically to enables said communication system to obscure identification of said cell identities by third parties.

2. The method of claim 1, wherein said operation is a shift down one operation, and said second set of cell identity values is generated by replacing each cell identifier in a position in a list stored in said at least one node with another cell identifier associated with a previous position in said list.

3. The method of claim 1, wherein said operation is one of: a shift one down operation, a shift one up operation, shift down k steps, shift up k steps, and pairwise exchange between blocks of adjacent entries in said first set of cell identity values, where k is an integer value greater than one.

4. The method of claim 1, wherein said first set of cell identity values and said second set of cell identity values are associated with at least one of: a cell plan list, a cell neighbor list, and a cell identifier associated with said at least one node.

5. The method of claim 1, wherein said at least one node is one or more of: a base station, a radio network controller, a switch, a router, a gateway, and a service and user management systems.

6. The method of claim 1, wherein said cell identities are CELL-IDs.

7. The method of claim 1, wherein said signal includes, as said command to implement an operation on said cell identities to change said cell identities from a first set of cell identity values to a second set of cell identity values, one of a plurality of different values, each of which are associated with a different operation.

8. The method of claim 7, wherein said plurality of different operations include at least two of: a shift one down operation, a shift one up operation, shift down k steps, shift up k steps, and pairwise exchange between blocks of adjacent entries in said first set of cell identity values, where k is an integer value greater than one.

9. A node in a communications system comprising:
    a memory device for storing at least one of:
        (a) at least one operation to be performed on cell identities to change said cell identities from a first set of cell identity values to a second set of cell identity values; and
        (b) at least one command value associated with said at least one operation; and
    a processor for transmitting at least one of said second set of cell identity values and one of said at least one command values, wherein each cell has a first identity value in said first set of cell identity values and said each cell has a second identity value in said second set of cell identity values, said first identity value being different than said second identity value; and further wherein said second identity value is used in said first set of cell identity values to identify another cell which is geographically close to said each cell, wherein said change of cell identities from said first set of cell identity values to said second set of cell identity values occurs periodically to enables said communication system to obscure identification of said cell identities by third parties.

10. The node of claim 9, wherein said at least one operation is a shift down one operation, and said second set of cell identity values is generated by replacing each cell identifier in a position in a list with another cell identifier associated with a previous position in said list.

11. The node of claim 9, wherein said at least one operation is at least one of: a shift one down operation, a shift one up operation, shift down k steps, shift up k steps, and pairwise exchange between blocks of adjacent entries in said first set of cell identity values, where k is an integer value greater than one.

12. The node of claim 9, wherein said first set of cell identity values and said second set of cell identity values are associated with at least one of: a cell plan list, a cell neighbor list, and a cell identifier associated with at least one node.

13. The node of claim 9, wherein said cell identity values are CELL-IDs.

14. The node of claim 9, wherein said at least one command value includes one of a plurality of different values, each of which are associated with a different operation.

15. The node of claim 14, wherein said plurality of different operations include at least two of: a shift one down operation, a shift one up operation, shift down k steps, shift up k steps, and pairwise exchange between blocks of adjacent entries in said first set of cell identity values, where k is an integer value greater than one.

16. A method for changing cell identities in a communication system from a first set of cell identity values to a second set of cell identity values, said method comprising:
receiving, at a node, a signal including one of:
(a) a command to perform an operation on said cell identities to change said cell identities from a first set of cell identity values to a second set of cell identity values; and
(b) said second set of cell identity values; and
replacing said first set of cell identity values with said second set of cell identity values wherein each cell has a first identity value in said first set of cell identity values and said each cell has a second identity value in said second set of cell identity values, said first identity value being different than said second identity value; and
further wherein said second identity value is used in said first set of cell identity values to identify another cell which is geographically close to said each cell, wherein said change of cell identities from said first set of cell identity values to said second set of cell identity values occurs periodically to enables said communication system to obscure identification of said cell identities by third parties.

17. The method of claim 16, wherein said operation is a shift down one operation, and said second set of cell identity values is generated by replacing each cell identifier in a position in a list stored in said at least one node with another cell identifier associated with a previous position in said list.

18. The method of claim 16, wherein said operation is one of: a shift one down operation, a shift one up operation, shift down k steps, shift up k steps, and pairwise exchange between blocks of adjacent entries in said first set of cell identity values, where k is an integer value greater than one.

19. The method of claim 16, wherein said first set of cell identity values and said second set of cell identity values are associated with at least one of: a cell plan list, a cell neighbor list, and a cell identifier associated with said node.

20. The method of claim 16, wherein said node is one or more of: a base station, a radio network controller, a switch, a router, a gateway, and a service and user management systems.

21. The method of claim 16, wherein said cell identities are CELL-IDs.

22. The method of claim 16, wherein said command includes one of a plurality of different values, each of which are associated with a different operation.

23. The method of claim 22, wherein said plurality of different operations include at least two of: a shift one down operation, a shift one up operation, shift down k steps, shift up k steps, and pairwise exchange between blocks of adjacent entries in said first set of cell identity values, where k is an integer value greater than one.

24. A node in a communications system comprising:
a memory device for storing a first set of cell identity values; and
a processor for receiving one of:
(a) a command associated with at least one operation to be performed on said first set of cell identity values to generate a second set of cell identity values; and
(b) said second set of cell identity values;
wherein each cell has a first identity value in said first set of cell identity values and said each cell has a second identity value in said second set of cell identity values, said first identity value being different than said second identity value; and
further wherein said second identity value is used in said first set of cell identity values to identify another cell which is geographically close to said each cell,
wherein said change of cell identities from said first set of cell identity values to said second set of cell identity values occurs periodically to enables said communication system to obscure identification of said cell identities by third parties.

25. The node of claim 24, wherein said at least one operation is a shift down one operation, and said second set of cell identity values is generated by replacing each cell identifier in a position in a list with another cell identifier associated with a previous position in said list.

26. The node of claim 24, wherein said at least one operation is at least one of: a shift one down operation, a shift one up operation, shift down k steps, shift up k steps, and pairwise exchange between blocks of adjacent entries in said first set of cell identity values, where k is an integer value greater than one.

27. The node of claim 24, wherein said first set of cell identity values and said second set of cell identity values are associated with at least one of: a cell plan list, a cell neighbor list, and a cell identifier associated with said node.

28. The node of claim 24, wherein said cell identity values are CELL-IDs.

29. The node of claim 24, wherein said at least one command value includes one of a plurality of different values, each of which are associated with a different operation.

30. The node of claim 29, wherein said plurality of different operations include at least two of: a shift one down operation, a shift one up operation, shift down k steps, shift up k steps, and pairwise exchange between blocks of adjacent entries in said first set of cell identity values, where k is an integer value greater than one.

31. The method according to claim 1, wherein said cell identities are changed from said first set of cell identity values to said second set of cell identity values to avoid detection of said cell identities by a third party and said geographically close cell corresponds to a predetermined geographic area.

32. The node according to claim 9, wherein said cell identities are changed from said first set of cell identity values to said second set of cell identity values to avoid detection of said cell identities by a third party and said geographically close cell corresponds to a predetermined geographic area.

33. The method according to claim 16, wherein said cell identities are changed from said first set of cell identity values to said second set of cell identity values to avoid detection of said cell identities by a third party and said geographically close cell corresponds to a predetermined geographic area.

34. The node according to claim 24, wherein said cell identities are changed from said first set of cell identity values to said second set of cell identity values to avoid detection of said cell identities by a third party and said geographically close cell corresponds to a predetermined geographic area.

* * * * *